US009392176B2

(12) United States Patent
Tsubaki

(10) Patent No.: US 9,392,176 B2
(45) Date of Patent: Jul. 12, 2016

(54) IMAGE CAPTURE APPARATUS AND CONTROL METHOD THEREFOR

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/329,354

(22) Filed: Jul. 11, 2014

(65) Prior Publication Data

US 2015/0022678 A1    Jan. 22, 2015

(30) Foreign Application Priority Data

Jul. 16, 2013 (JP) ................................. 2013-147920

(51) Int. Cl.
*H04N 5/228* (2006.01)
*H04N 5/232* (2006.01)

(52) U.S. Cl.
CPC ........ *H04N 5/23287* (2013.01); *H04N 5/23254* (2013.01)

(58) Field of Classification Search
CPC .......... H04N 5/23248; H04N 5/23251; H04N 5/23254; H04N 5/23258; H04N 5/23264; H04N 5/23267; H04N 5/23277
USPC ........ 348/208.99, 208.1–208.7; 382/293–298
See application file for complete search history.

(56) References Cited

U.S. PATENT DOCUMENTS

| 7,777,782 | B2 * | 8/2010 | Eromaki | H04N 5/2254 348/208.4 |
| 8,294,773 | B2 * | 10/2012 | Oshino | H04N 5/23248 348/208.6 |
| 8,922,664 | B2 * | 12/2014 | Oshino | H04N 5/23248 348/208.99 |
| 2003/0067544 | A1 * | 4/2003 | Wada | G03B 5/00 348/208.7 |
| 2005/0206739 | A1 * | 9/2005 | Kamoshida | G06T 5/006 348/208.99 |
| 2014/0078327 | A1 * | 3/2014 | Miyasako | H04N 5/23258 348/208.6 |
| 2014/0111658 | A1 * | 4/2014 | Watanabe | H04N 5/23267 348/208.1 |
| 2014/0111659 | A1 * | 4/2014 | Miyasako | H04N 5/23258 348/208.1 |
| 2014/0111661 | A1 * | 4/2014 | Watanabe | G06T 5/003 348/208.6 |

FOREIGN PATENT DOCUMENTS

| JP | 2008-005084 A | 1/2008 |
| JP | 2011-145604 A | 7/2011 |

* cited by examiner

*Primary Examiner* — Kelly L Jerabek
(74) *Attorney, Agent, or Firm* — Cowan, Liebowitz & Latman, P.C.

(57) ABSTRACT

An image capture apparatus has an image sensor and an optical anti-shake mechanism that reduces a shake of a captured image by driving an optical correction element in a different direction from an optical axis of an imaging optical system in accordance with a detected shake. Reference coordinates for geometric deformation processing applied to the captured image are determined based on an amount and direction of a movement of the optical correction element. The geometric deformation processing is applied to the captured image using these reference coordinates and an amount of geometric deformation based on the detected shake. Coordinates of the captured image corresponding to an intersection of the optical axis and the image sensor after the optical correction element is moved through the driving are determined as the reference coordinates.

7 Claims, 8 Drawing Sheets

TRANSLATION

MAGNIFICATION/REDUCTION

PLANAR ROTATION

PROJECTION (YAW DIRECTION)

PROJECTION (PITCH DIRECTION)

RS DISTORTION (YAW)   RS DISTORTION (PITCH)   RS DISTORTION (ROLL)

ORIGINAL IMAGE

IMAGE FOR WHICH SKEW CORRECTION
HAS BEEN PERFORMED

IMAGE FOR WHICH SKEW CORRECTION HAS BEEN PERFORMED
AFTER MOVING REFERENCE COORDINATES

FIG. 7A   FIG. 7B   FIG. 7C
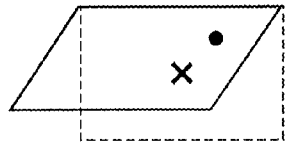 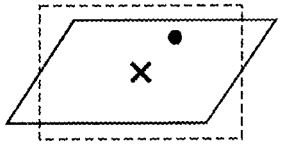 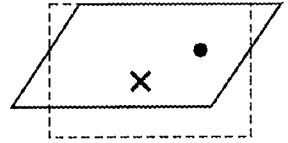
IN REFERENCE TO FIRST LINE    IN REFERENCE TO CENTRAL COORDINATES OF IMAGE    IN REFERENCE TO IMAGE CENTER
FIG. 8
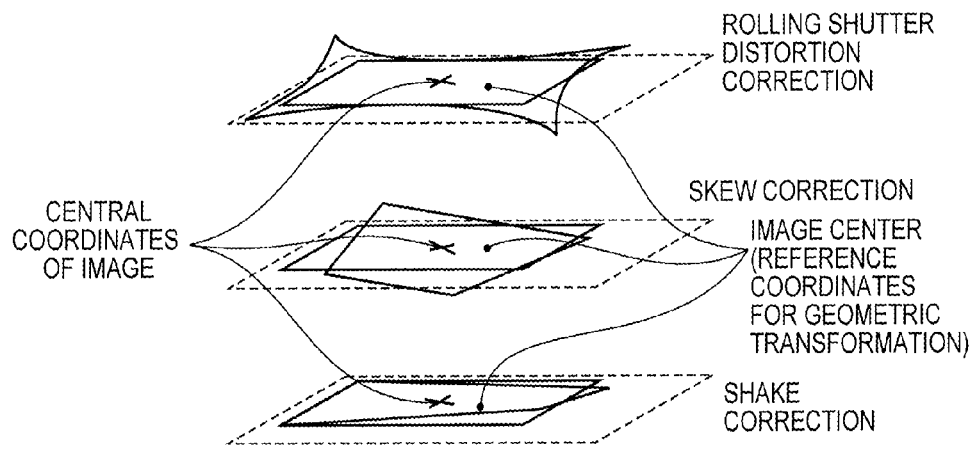

IMAGE WITHOUT BLURRING        IMAGE WITH BLURRING        OPTICAL ANTI-SHAKE IMAGE

IMAGE CORRECTED IN REFERENCE
TO IMAGE CENTER
IN CONSIDERATION OF
OPTICAL ANTI-SHAKE OPERATION

IMAGE CORRECTED IN REFERENCE
TO CENTRAL COORDINATES OF
IMAGE IN CONSIDERATION OF
OPTICAL ANTI-SHAKE OPERATION

IMAGE CAPTURE APPARATUS AND CONTROL METHOD THEREFOR

BACKGROUND OF THE INVENTION

1. Field of the Invention

The present invention relates to an image capture apparatus and a control method therefor, and in particular to an image capture apparatus with an optical anti-shake mechanism and a control method therefor.

2. Description of the Related Art

Conventionally, a so-called image stabilization function is known that corrects (alleviates) blurring of a captured image (image shake) caused by a movement of an image capture apparatus, and representative methods for realizing the image stabilization function include optical image stabilization and electronic image stabilization (Japanese Patent Laid-Open No. 2011-145604). The optical image stabilization is a method for reducing a movement of an image of a subject by moving optical elements such as a shift lens and an image sensor based on a detected amount of shake of an image capture apparatus. On the other hand, the electronic image stabilization is a method for reducing a movement of an image of a subject by setting an effective pixel region smaller than a capturable range and shifting the position of the effective pixel region based on a detected amount of shake of an image capture apparatus.

Blurring of a captured image (image shake) caused by a movement of an image capture apparatus includes not only translational (translational direction) components that can be corrected using an image stabilization method described in Japanese Patent Laid-Open No. 2011-145604, but also rotational direction components, such as yaw, pitch, and roll components, attributed to a rotation of the image capture apparatus (rotational shake). Meanwhile, Japanese Patent Laid-Open No. 2008-5084 discloses a technique to correct an image shake related to rotational direction components of the shake by detecting motion vectors from a captured image and applying geometric deformation processing to the captured image in accordance with the motion vectors.

An image correction technique using the geometric deformation processing can be utilized not only for correction of rotational direction components of the shake, but also for correction of optical aberration, correction of a rolling shutter distortion unique to a CMOS image sensor, correction of a distortion that occurs in a case where an image of a subject is captured from below (projection distortion), etc. In view of this, it is thought that more advanced anti-shake effects can be achieved by applying the geometric deformation processing to an image for which optical hand movement correction has been performed (optical anti-shake image).

However, a method for detecting and estimating an image distortion using motion vectors at the time of application of the geometric deformation processing lowers the accuracy depending on scenes, increases an amount of computation necessary for high-accuracy estimation, and makes the estimation itself difficult. For example, in the case of a low-contrast image, such as an image captured indoors, it is more likely that motion vectors fail to be detected and erroneous motion vectors are detected. Therefore, for example, if a rolling shutter distortion is corrected in accordance with a moving subject, there is a possibility of the occurrence of harmful effects, e.g., a distortion of a portion that is supposed to be still, and a continuous image shake after the correction.

Furthermore, if a rolling shutter distortion in the roll direction is estimated from motion vectors simultaneously with the shake, there will be more estimation variables, leading to an explosive increase in an amount of computation and destabilization of solution estimation. Furthermore, it is basically not easy to estimate a rolling shutter distortion from motion vectors with high accuracy. Moreover, the difficulty will further increase if correction parameters for a radial distortion and optical aberration such as transverse chromatic aberration are simultaneously estimated from motion vectors.

SUMMARY OF THE INVENTION

The present invention has been made in view of the above problems of conventional techniques. The present invention provides an image capture apparatus and a control method therefor, the image capture apparatus being capable of improving the accuracy of hand movement correction, optical aberration correction, and the like by applying geometric deformation processing based on orientation information of an image capture apparatus to an image for which optical shake correction has been performed.

According to an aspect of the present invention, there is provided an image capture apparatus with an optical anti-shake mechanism that reduces a shake of a captured image by driving an optical correction element in a different direction from an optical axis of an imaging optical system in accordance with a detected shake, the image capture apparatus comprising: an image sensor; a determination unit configured to determine reference coordinates for geometric deformation processing applied to the captured image based on an amount and direction of a movement of the optical correction element; and a deformation processing unit configured to apply the geometric deformation processing to the captured image using the reference coordinates determined by the determination unit and an amount of geometric deformation based on the detected shake, wherein the determination unit determines, as the reference coordinates for the geometric deformation processing, coordinates of the captured image corresponding to an intersection of the optical axis and the image sensor before the optical correction element is moved through the driving.

According to another aspect of the present invention, there is provided a control method for an image capture apparatus having an image sensor and an optical anti-shake mechanism that reduces a shake of a captured image by driving an optical correction element in a different direction from an optical axis of an imaging optical system in accordance with a detected shake, the control method comprising: a determination step of determining reference coordinates for geometric deformation processing applied to the captured image based on an amount and a direction of a movement of the optical correction element; and a deformation processing step of applying the geometric deformation processing to the captured image using the reference coordinates determined in the determination step and an amount of geometric deformation based on the detected shake, wherein the determination step determines, as the reference coordinates for the geometric deformation processing, coordinates of the captured image corresponding to an intersection of the optical axis and the image sensor before the optical correction element is moved through the driving.

Further features of the present invention will become apparent from the following description of exemplary embodiments with reference to the attached drawings.

BRIEF DESCRIPTION OF THE DRAWINGS

FIGS. 7A to 7C schematically show the results of correction according to lines of reference coordinates for geometric deformation processing for correcting a rolling shutter distortion.

FIG. 8 schematically shows control in which an image center is used as reference coordinates for geometric deformation related to rolling shutter distortion correction, skew correction, and shake correction.

DESCRIPTION OF THE EMBODIMENTS

Exemplary embodiments of the present invention will now be described in detail in accordance with the accompanying drawings.

First Embodiment

Figure 1:
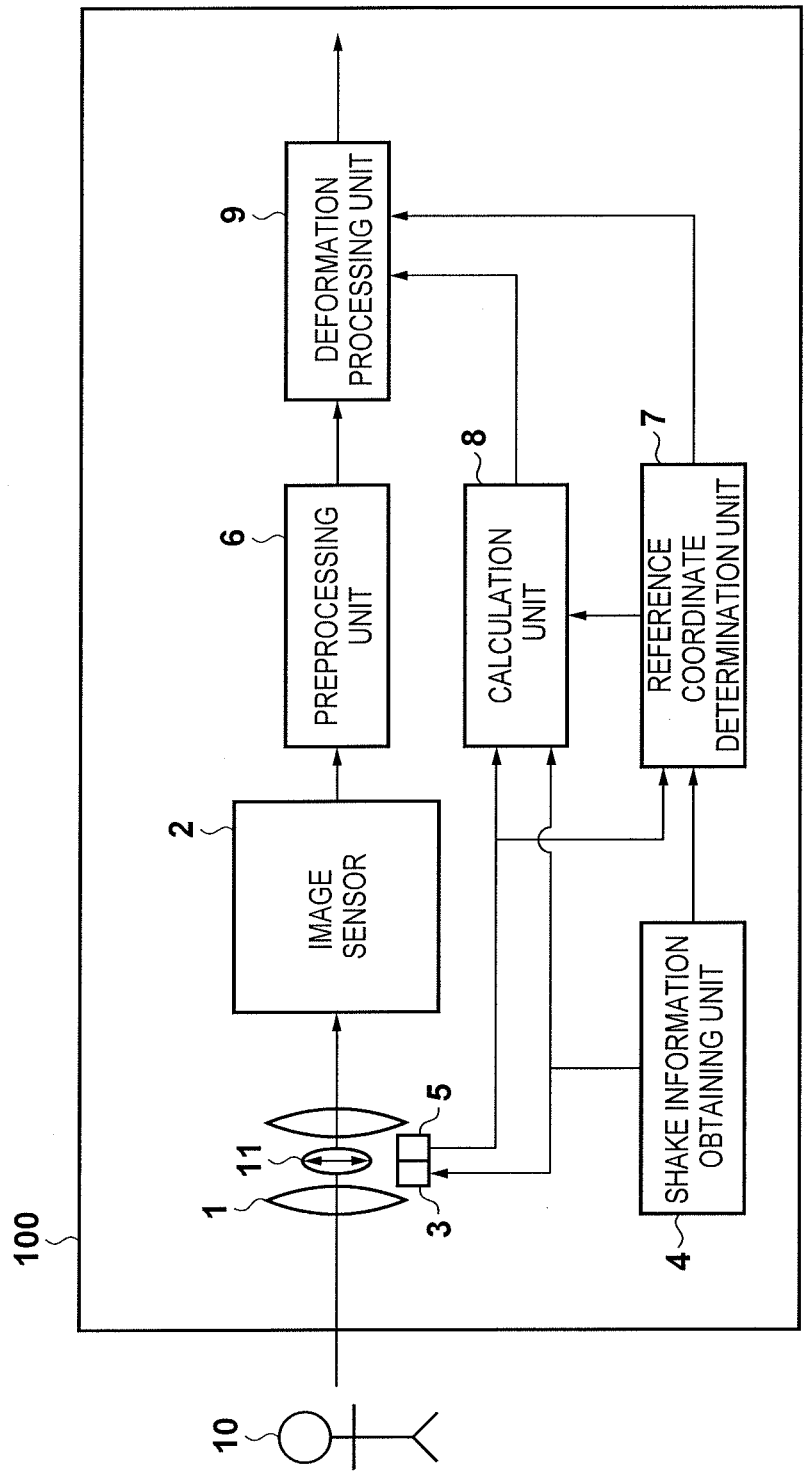
FIG. 1 shows an example of a functional configuration of a digital camera, which is one example of an image capture apparatus according to a first embodiment, related to anti-shake control.

An exemplary embodiment of the present invention will now be described in detail with reference to the attached drawings. FIG. 1 shows an example of a functional configuration of a digital camera 100, which is one example of an image capture apparatus according to a first embodiment of the present invention, related to anti-shake control. In FIG. 1, a part of a configuration of a general digital camera that is not directly related to the present invention is omitted.

Optics 1 is an imaging optical system that include a plurality of lenses, such as a focus lens and a shake correction lens 11, and focus incident light from a subject 10 onto an imaging surface of an image sensor 2. The image sensor 2, which is a CCD image sensor or a CMOS image sensor, is composed of a plurality of pixels that are two-dimensionally arrayed. It is assumed that the image sensor 2 according to the present embodiment is a CMOS image sensor as the present embodiment describes an example in which a rolling shutter distortion is corrected through geometric deformation processing; alternatively, it may be a CCD image sensor. The digital camera 100 has an optical anti-shake function for reducing a shake of an image caused by a shake of the digital camera 100 by causing the shake correction lens 11 to move along a plane perpendicular to an optical axis so as to translate the position of an optical image on the imaging surface. Alternatively, an optical anti-shake function may be provided for causing the image sensor 2, in place of the shake correction lens 11, to move along the plane perpendicular to the optical axis. The shake correction lens 11 and the image sensor 2 can be driven using an actuator provided with piezoelectric elements and the like, an electromagnet, etc. Herein, a shake correction lens and an image sensor that are configured to be movable along the plane perpendicular to the optical axis or to be movable in a different direction from the optical axis are referred to as anti-shake elements or optical correction element.

An optical anti-shake control unit 3 performs an anti-shake operation by controlling translation of the shake correction lens 11. If the shake correction lens 11 is included in the optics 1, translation of a lens serving as the shake correction lens 11 is controlled, and if the shake correction lens 11 is included in the image sensor, translation of the image sensor 2 is controlled.

A shake information obtaining unit 4 includes, for example, an orientation sensor such as a gyroscope, and is attached to any axis perpendicular to an optical axis of the optics 1. The shake information obtaining unit 4 outputs a signal indicating an orientational change of the digital camera 100 to the optical anti-shake control unit 3 and a calculation unit 8. If the orientation sensor is a rotation sensor, the shake information obtaining unit 4 is attached to axes of the yaw, pitch, and roll directions of the digital camera 100 and measures an orientational change caused by rotation around the axes. The optical anti-shake control unit 3 reduces blurring of a captured image caused by a shake of the digital camera 100 by causing the shake correction lens 11 (or the image sensor 2) to move along the plane perpendicular to the optical axis based on the measured orientational change of the digital camera 100.

A monitoring unit 5 includes, for example, a Hall sensor or an encoder and measures a translation amount of the shake correction lens 11. The monitoring unit 5 may also obtain control information of the optical anti-shake control unit 3 in place of the shake information obtaining unit 4.

A preprocessing unit 6 applies, to an analog image signal obtained through photoelectric conversion of the image sensor 2, fundamental processing such as noise removal by correlated double sampling (CDS), exposure control by way of gain-up through automatic gain control (AGO), black level correction, and A/D conversion. The preprocessing unit 6 supplies an obtained digital image signal to a deformation processing unit 9. The preprocessing unit 6 is also referred to as an AFE (analog front-end). If the image sensor 2 outputs a digital image signal, the preprocessing unit is referred to as a DFE (digital front-end).

A reference coordinate determination unit 7 determines reference coordinates for geometric deformation processing executed by the deformation processing unit 9 based on camera parameters including, for example, a focal length of the optics 1 and a pixel size of the image sensor 2, and on information of a translation amount of an image obtained from the monitoring unit 5.

The calculation unit 8 calculates an amount of geometric deformation applied by the deformation processing unit 9 based on camera parameters, on information of an orientational change obtained from the shake information obtaining unit 4, and on information of a change in a movement velocity of the shake correction lens 11 obtained from the monitoring unit 5.

The deformation processing unit 9 applies geometric transformation to a captured image (optical anti-shake image) indicated by the digital image signal output from the preprocessing unit 6 based on the reference coordinates determined by the reference coordinate determination unit 7, on the amount of geometric deformation calculated by the calculation unit 8, and on the camera parameters. The deformation processing unit 9 reduces the effects of a shake included in the optical anti-shake image through the geometric deformation processing.

The operations of the elements will now be described in order.

First, the shake information obtaining unit 4 converts sensor output information in the form of a voltage value, current value, or digital value obtained from, for example, the gyroscope constituting the orientation sensor at a frequency corresponding to a sampling frequency $f_{s\_g}$ into an amount of angular change, and outputs the amount of angular change. For example, assume that the shake information obtaining unit 4 is an orientation sensor utilizing a gyroscope that performs digital output. In this case, the shake information obtaining unit 4 obtains an angular velocity $rat_{x\_g}(i)$ by multiplying a sensor output value $val_{x\_g}$ of each coordinate axis direction by a correction gain $gain_x$ that has been obtained by preliminary calibration, as indicated by expression (2). It should be noted that it is not necessary to use one sensor for one axis, and it is permissible to use a sensor that can measure orientational changes around multiple axes at once.

$$rat_{x\_g}(i) = gain_x \cdot val_{x\_g}(i)(x=Y, P, R)(2)(x=Y, P, R)$$

Here, "x" denotes an axis direction of a Cartesian coordinate system in reference to the optical axis of the optics, and is one of the yaw direction (x=Y), the pitch direction (x=P), and the roll direction (x=R) of the digital camera 100. Also, "_g" denotes information obtained from measurement values of the orientation sensor.

The shake information obtaining unit 4 supplies angular velocity information $rat_{Y\_g}(i)$, $rat_{P\_g}(i)$ related to the yaw direction and the pitch direction to the optical anti-shake control unit 3 as driving information of the shake correction lens 11. The optical anti-shake mechanism including the shake information obtaining unit 4, the optical anti-shake control unit 3, and the shake correction lens 11 is not limited to being controlled using a particular method, and may be controlled using any method.

Furthermore, angular velocity information calculated by the shake information obtaining unit 4 can be considered as an orientational change of the digital camera 100 expressed by an angular change in one sampling period of the gyroscope, $t_{s\_g}=1/f_{s\_g}$. A plurality of sample values may be integrated to reduce a data amount and then supplied to the calculation unit 8 if an information amount per unit time is too large due to a high sampling frequency, or depending on the intended use. For example, angular velocity information may be integrated to be appropriate for a sampling frequency $f_{s\_rsc}$ if it is used in calculation of an amount of rolling shutter distortion correction, and for a sampling frequency $f_{s\_fr}$ if it denotes an orientational change between frames.

For example, while $f_{s\_g}$ exceeds 1 kHz in some cases, $f_{s\_fr}$ may be 60 Hz and 30 Hz, in which case approximately 20 to 30 samples are integrated. Furthermore, ideally, $f_{s\_rsc}$ should be a value for a timing corresponding to image heights of pixels. However, as this frequency exceeds 60 kHz at the time of capturing moving images of an HD resolution at a frame rate of 60 fps, angular velocity information is obtained at a highest possible sampling rate exceeding at least a frame rate. For an image height that does not correspond to a timing for obtaining angular velocity information, a value is generated from a sample value obtained at another timing by making use of, for example, prediction, interpolation, and hold techniques.

Information generation processing at a high sampling rate may be executed by a functional block that utilizes angular velocity information, such as the calculation unit 8 and the deformation processing unit 9. Below, an arbitrary sampling frequency is noted as $f_{s\_y}$ (:$f_{s\_rsc}$, $f_{s\_fr}$, ... ). Information is exchanged after conversion into an appropriate amount of orientational change in a sampling period on a processing-by-processing basis through integration based on the following expression (3).

$$rat_{x\_y}(j) = \int_0^{n_{y\_g}-1} gain_x \cdot val(n_{y\_g} j + t) dt \qquad (3)$$
$$= \sum_{i=0}^{n_{y\_g}-1} (gain_x \cdot val(n_{y\_g} j + i) \cdot t_{s\_y})$$

Here, $dt=t_{s\_y}$. Note that $n_{y\_g}$ is a scale factor ($f_{g\_y}/f_{s\_y}$) of a sampling period ($1/f_{s\_y}$) after integration under the assumption that a sampling period ($1/f_{s\_g}$) of the orientation sensor is one. Also, $rat_{x\_y}(j)$ denotes an amount of orientational change corresponding to a sampling target y and period j with respect to the aforementioned axes x (yaw axis, pitch axis, and roll axis). Also, $t_{s\_y}$ denotes a target-by-target sampling interval ($=1/f_{s\_y}$).

The shake information obtaining unit 4 may be configured to perform output after applying processing for improving the accuracy to sample values of the sensor. For example, if the gyroscope is used, processing for reducing the offset drift can be applied. As one example of such a configuration, the drift may be reduced by, for example, adding an acceleration sensor and executing processing for comparing information of orientational changes. Processing for improving the accuracy of sensor output values is not limited to particular processing, and any known technique can be used.

Next, the monitoring unit 5 measures an actual amount of movement of the shake correction lens 11 according to control by the optical anti-shake control unit 3, and outputs the measured amount to the reference coordinate determination unit 7 and the calculation unit 8. Specifically, the monitoring unit 5 calculates a position of an image center that has been moved due to translation of the shake correction lens 11, and information for monitoring a change velocity of the position of the image center. An image center denotes an intersection of the optical axis of the optics 1 and the image sensor 2. Therefore, a translation amount of an optical image caused by a movement of the anti-shake element is equivalent to a translation amount of an image center. The monitoring unit 5 outputs a value of a translation amount of the shake correction lens 11 measured using the Hall sensor, encoder, and the like. Similarly to the shake information obtaining unit 4, the output may be performed after improving the accuracy of the measured value by, for example, using a calibration coefficient such as a correction gain and applying processing for improving the accuracy of the measured value. On the other hand, if the measured value does not require high accuracy, a value obtained by converting driving/control information of the shake correction lens 11 output from the optical anti-shake control unit 3 into an amount of movement may be output without performing the measurement.

Figure 2A:
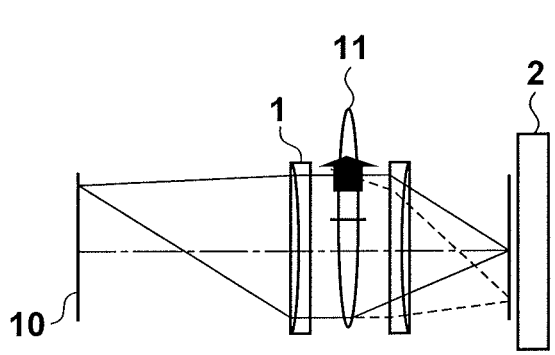
FIGS. 2A to 2D schematically show an optical anti-shake operation for moving a shake correction lens and an image sensor.
Figure 2B:
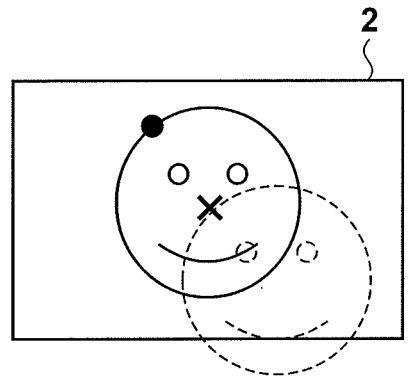

First, an optical anti-shake operation for translating the shake correction lens 11 will be described with reference to FIGS. 2A to 2D. The optics 1 is configured to form an optical image of a subject 10 onto the imaging surface of the image sensor 2. Referring to FIG. 2A, broken lines indicate optical paths corresponding to a position of the shake correction lens 11, which is the anti-shake element, prior to the movement, whereas solid lines indicate optical paths obtained by translating the shake correction lens 11 upward. By moving the shake correction lens 11 upward, an image of the subject moves toward the center of the image sensor 2. That is to say, as indicated by dash lines and solid lines in FIG. 2B, the movement of the shake correction lens 11 enables a position at which an image of a subject is formed in the image sensor 2 to translate from a lower peripheral portion toward the center. In FIG. 2B, x and ● respectively denote image centers before and after the movement of the shake correction lens 11. In this way, the image center moves along with the translation of the optical image.

Figure 2C:
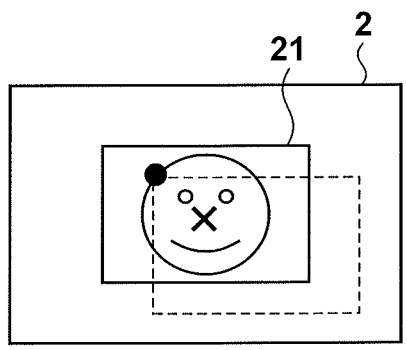
Figure 2D:
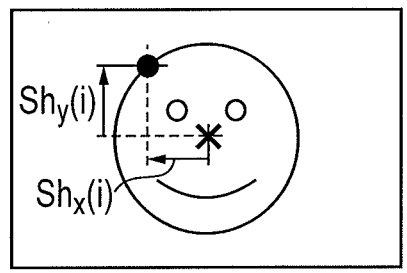

If the image sensor 2 is the anti-shake element, the image sensor 2 is moved along the plane perpendicular to the optical axis in place of the shake correction lens 11. In this case, an image capture region is smaller than an effective pixel region of the image sensor 2. FIG. 2C schematically shows a positional change in an optical image and an image center (the center of an image capture region 21) for a case where the image sensor 2 is the anti-shake element. Similarly to FIG. 2B, x and ● respectively denote image centers before and after the movement of the image sensor 2. Although a direction of movement of the image sensor 2 and a direction of movement of the shake correction lens 11 are symmetric with the optical axis therebetween, similar effects are achieved; therefore, in the following description of geometric image transformation, which one of the shake correction lens 11 and the image sensor 2 is the anti-shake element is not distinctively mentioned. If the image sensor 2 is the anti-shake element, the optical anti-shake control unit 3 translates the image sensor 2, and the monitoring unit 5 measures a translation amount of the image sensor 2.

In the present embodiment, translation information $sh_x$ (x=Y, P) of a captured image is used as one example of monitoring information for optical anti-shake control, because it represents a physical amount that is easily treated in geometric transformation processing. As described above, as a translation amount of an image is equivalent to (or can be converted from) a translation amount of the anti-shake element, a translation amount of the anti-shake element is used in practice. It should be noted that, as indicated by the following expression (4), translation information of a captured image may be normalized using a focal length, which is a camera parameter, and used as a translation amount in a normalized space for a focal length 1.

$$sh_x = sh_x'/f \quad (4)$$

In expression (4), $sh_x'$ (x=Y, P) denotes a translation amount of an image in units of [mm] or [pixel], and f denotes a focal length of the optics 1 in units of [mm] or [pixel]. Also, $sh_x$ (x=Y, P) denotes a normalized translation amount.

In addition to a translation amount of a time point (i), $sh_x(i)$, the following change velocity of the translation amount $sh_x(i)$ is also one of the monitoring information for the optical anti-shake control as it affects a rolling shutter distortion.

$$\Delta sh_x(i) = sh_x(i) - sh_x(i-1) \quad (5)$$

The sampling rates of $sh_x(i)$, $\Delta sh_x(i)$ can be higher than or equal to the above-described $f_{s\_f}$, $f_{s\_rsc}$.

The monitoring unit 5 outputs, to the reference coordinate determination unit 7, a translation amount of the shake correction lens 11 as a translation amount of an image, $sh_x(i)$, serving as monitoring information for the optical anti-shake control. The monitoring unit 5 also outputs, to the calculation unit 8, a translation amount of the shake correction lens 11 and a change velocity thereof as a translation amount of an image, $sh_x(i)$, and a change velocity $\Delta sh_x(i)$ thereof serving as monitoring information for the optical anti-shake control.

A description is now given of the geometric deformation processing executed by the deformation processing unit 9. The deformation processing unit 9 according to the present embodiment realizes skew correction, rolling shutter distortion correction, and shake correction as anti-shake processing through geometric deformation. Furthermore, in the present embodiment, geometric transformation processing is executed using backward mapping, in which pixels in an input image are sampled and interpolated based on post-deformation image coordinates, such that an image does not include defective pixels after the geometric deformation. Sampling is performed based on pixel coordinates of the input image, and data of output pixels is generated through interpolation. Interpolation processing is executed using pixel values near calculated sampling coordinates in the input image in accordance with an interpolation method. Interpolation methods that can be applied in the interpolation processing include, but are not limited to, bilinear interpolation processing for performing linear interpolation using 4 nearby pixels, and bicubic interpolation processing for performing third-order interpolation using 16 nearby pixel values.

Figure 3:
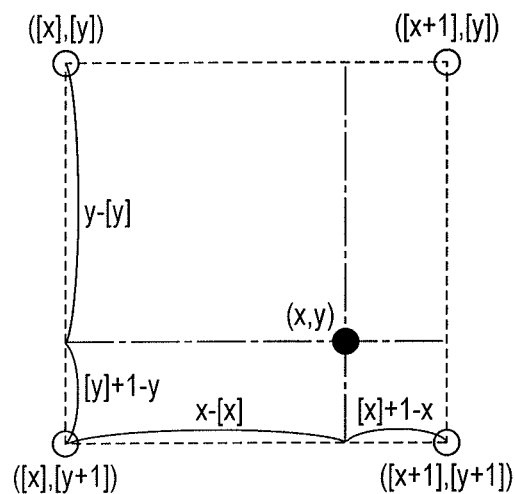
FIG. 3 is a diagram for describing bilinear interpolation, which is one example of typical interpolation methods.

Bilinear interpolation, which is one example of typical interpolation methods, will now be described with reference to FIG. 3. In accordance with the result of performing later-described coordinate calculation for output pixels, pixel data of sampling coordinates in an input image is calculated through interpolation of surrounding pixel values. Sampling coordinates have information including fractional parts. In FIG. 3, ● denotes sampling coordinates, and ○ denotes four nearby pixels in an input image (whose coordinates have integer values). In this case, the following expression (6) is used to calculate a pixel value at the sampling coordinates from the four nearby pixels in accordance with the bilinear interpolation method.

$$I(x,y) = ([x]+1-x)([y]+1-y)f([x],[y]) + ([x]+1-x)(y-[y])f([x],[y]+1) + (x-[x])([y]+1-y)f([x]+1,[y]) + (x-[x])(y-[y])f([x]+1,[y]+1) \quad (6)$$

Here, I(x, y) denotes a pixel value generated through interpolation, and f( ) denotes a pixel value in the input image. An output image is generated by executing this interpolation processing sequentially for all pixels in the image after the geometric deformation (output image).

If a plurality of types of corrections are performed through the geometric deformation processing, the order of application of the corrections can be dynamically changed in accordance with a speed of a movement of the camera, a magnitude of aberration of the optics, and the like. For example, if the movement of the camera is fast, rolling shutter distortion correction, skew correction, and shake correction are performed in this order. On the other hand, if an amount of aberration of the optics, e.g., an amount of radial distortion is large, skew correction, rolling shutter distortion correction, and shake correction are performed in this order. It should be noted that, aside from the correction processing, the output image may be cropped, resized, etc. at the end of the geometric deformation processing.

The following describes the substance of the geometric deformation processing executed by the deformation processing unit 9 according to the present embodiment to realize skew correction, rolling shutter distortion correction, and shake correction, that is to say, coordinate calculation. As mentioned above, the present embodiment adopts backward mapping, in which coordinate calculation for realizing correction processing is performed in a reverse order from a processing order, such that an output image does not include defective pixels. It will be assumed that an amount of aberration of the optics, e.g., an amount of radial distortion is large, and shake correction, rolling shutter distortion correction, and skew correction will be described in this order, which is the reverse order from the processing order.

In the shake correction, an image shake caused by rotational and translational motions of the camera is corrected through the geometric deformation processing. Based on information indicating an orientational change of the digital camera 100 obtained by the shake information obtaining unit 4, the calculation unit 8 calculates an amount of geometric deformation (geometric deformation parameter) with a correction amount (deformation amount) that takes into consideration a margin and magnitude of correction effects. The deformation processing unit 9 performs the shake correction by applying geometric deformation in accordance with the deformation parameter. Geometric deformation may be, for example, projective transformation, in which case a geometric transformation parameter is given as a 3×3 projective transformation matrix (homography matrix).

For example, assume that the shake information obtaining unit 4 obtains information indicating an orientational change caused by rotation around the axes of the yaw direction, pitch direction, and roll direction of the digital camera 100, and there is no need to control a maximum change amount as a sufficient margin is given. In this case, a geometric deformation parameter (homography matrix H) is given by the following expression (7).

$$H = \begin{bmatrix} a & b & c \\ d & e & f \\ g & h & i \end{bmatrix}$$

$$= \begin{bmatrix} \cos(-\alpha R) & -\sin(-\alpha R) & 0 \\ \sin(-\alpha R) & \cos(-\alpha R) & 0 \\ 0 & 0 & 1 \end{bmatrix} \begin{bmatrix} \cos(-\alpha Y) & 0 & \sin(-\alpha Y) \\ 0 & 1 & 0 \\ -\sin(-\alpha Y) & 0 & \cos(-\alpha Y) \end{bmatrix} \begin{bmatrix} 1 & 0 & 0 \\ 0 & \cos(-\alpha P) & -\sin(-\alpha P) \\ 0 & \sin(-\alpha P) & \cos(-\alpha P) \end{bmatrix}$$

$$\begin{bmatrix} X'_{Oh} \\ Y'_{Oh} \\ m \end{bmatrix} = H \begin{bmatrix} X_r - X_{Oh} \\ Y_t - Y_{Oh} \\ 1 \end{bmatrix} + \begin{bmatrix} X_{Oh} \\ Y_{Oh} \\ 0 \end{bmatrix}$$

$$\begin{bmatrix} X''_h \\ Y''_h \end{bmatrix} = \begin{bmatrix} X'_h/m \\ Y'_h/m \end{bmatrix}$$

(7)

Here, R, P and Y respectively denote rotations in the roll, pitch, and yaw directions with respect to the optical axis, and α denotes a shake reduction rate. Also, a negative sign denotes reduction. Also, $X_{Oh}$ and $Y_{Oh}$ denote the center of geometric deformation (reference coordinates for coordinate transformation).

Figure 4:
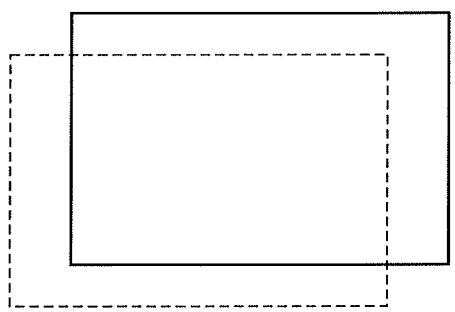
FIG. 4 shows examples of standard geometric deformation used in shake correction.
Figure 4:
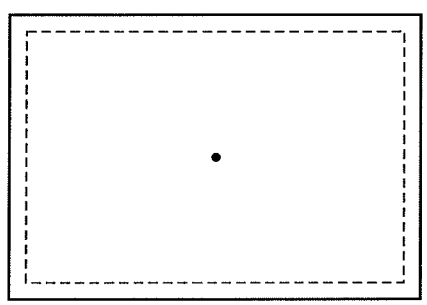
Figure 4:
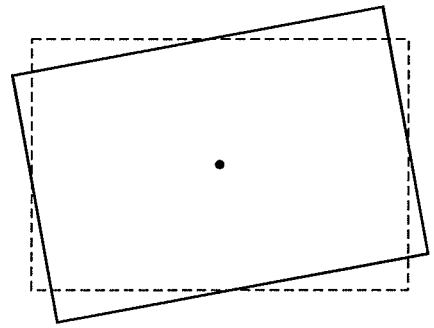
Figure 4:
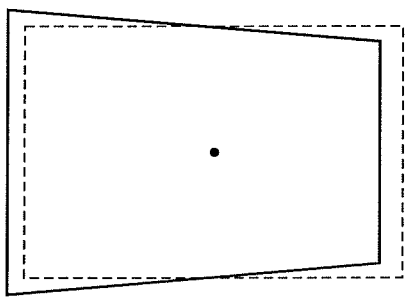
Figure 4:
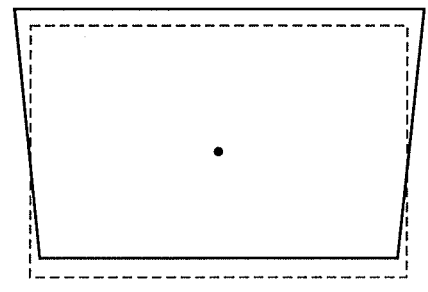

FIG. 4 shows geometric deformation related to translation, magnification/reduction, planar rotation, and projection directions (yaw and pitch), as examples of standard geometric deformation used in the shake correction. Except for geometric deformation related to translation, the center of geometric deformation, which is indicated by a black circle in FIG. 4, is important. If the digital camera 100 undergoes only a rotational motion and the shake correction is performed using expression (7) based on orientational change information from the shake information obtaining unit 4, it is necessary to match the center of geometric deformation with the image center.

Normalized image coordinates are used in the described geometric deformation. For this reason, in the actual deformation processing, geometric deformation is performed using a determinant CHC⁻ for normalization, which includes a camera parameter matrix C indicated by the following expression (7') and an inverse matrix C⁻ thereof, as well as the homography matrix H interposed therebetween.

$$C = \begin{bmatrix} f & 0 & 0 \\ 0 & f & 0 \\ 0 & 0 & 1 \end{bmatrix} \quad (7')$$

Here, f denotes a focal length of the optics 1.

Figure 5:
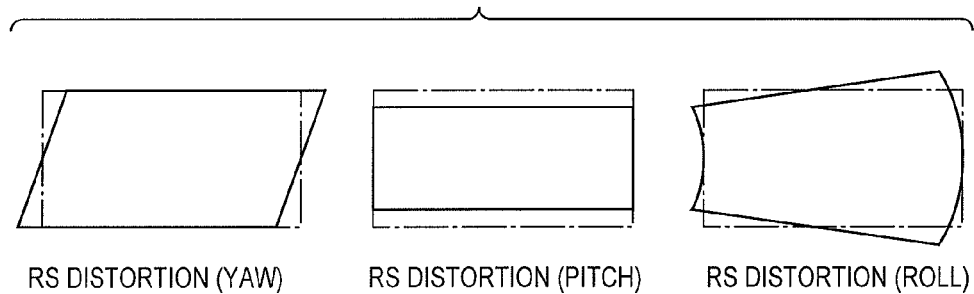
FIG. 5 shows examples of a rolling shutter distortion.

A rolling shutter distortion is a distortion of a captured image that occurs upon movement of the camera or subject during an exposure period for a single captured image (frame) in a case where an image sensor that performs exposure at different timings between scan lines (horizontal pixel lines) is used. This distortion is corrected through geometric deformation in the rolling shutter distortion correction. FIG. 5 shows examples of the rolling shutter distortion (RS distortion). From left, examples of the rolling shutter distortion are shown that occur respectively when the camera undergoes a constant-velocity motion in the yaw, pitch, and roll directions during an exposure period. The examples of distortions in the yaw and pitch directions are similar to twisting caused by a translational movement of the camera in horizontal and vertical directions.

In accordance with a geometric deformation parameter that the calculation unit 8 has calculated from orientational change information obtained by the shake information obtaining unit 4, the deformation processing unit 9 performs the rolling shutter distortion correction through geometric deformation by applying coordinate transformation to an input image. For example, provided that the only movement of the camera is a minute change in the yaw direction (Y) and the pitch direction (P) at a constant velocity, and that an arbitrary horizontal line in an image serves as a reference line (invariable line) $Y_0w$ for correction, the rolling shutter distortion correction through geometric deformation can be expressed by the following expression (8).

$$\begin{bmatrix} X'_w \\ Y'_w \end{bmatrix} = \begin{bmatrix} X_h \\ Y_h \end{bmatrix} - \begin{bmatrix} y \\ p \end{bmatrix}(Y_h - Y_0 w) \quad (8)$$

Here, y and p denote amounts of conversion from movements of the camera in the yaw and pitch directions between scan lines to movements in an image, and are given by the calculation unit 8 as geometric deformation parameters. For example, the calculation unit 8 can convert a movement of the camera into a movement in an image using the following expression (9).

$$y = f \tan(Y)/\Delta\text{pix}$$

$$p = -f \tan(P)/\Delta\text{pix} \quad (9)$$

Here, Y' denotes a movement of the camera in the yaw direction (Y) between scan lines, f denotes a focal length, and Δp denotes a pixel size. A geometric transformation parameter may be calculated for every single horizontal line, or may be calculated for a plurality of horizontal lines.

The mechanism of the occurrence of a rolling shutter distortion is substantially the same as that of a shake. Therefore, if a shake of the digital camera includes only rotational direction components and the rolling shutter distortion correction is performed only through projective transformation based on the orientational change information, it is necessary to execute correction processing in order of roll, pan, and tilt. This order is reversed when the backward mapping is performed.

The reference line $Y_0w$ does not move in the rolling shutter distortion correction. If the rolling shutter distortion correction is performed by itself, it is not necessary to pay particular attention to the position of the reference line $Y_0w$. However, if collective processing is executed in combination with other corrective transformations, a change in the reference line $Y_0w$ causes the image center to move due to translation of an image position after the correction and a change in the scale attributed to magnification/reduction (see FIGS. 7A to 7C). Therefore, if a plurality of types of corrections are performed by combining a plurality of geometric deformations as in the present embodiment, it is necessary to appropriately manage a reference line.

In the geometric deformation parameter calculation processing executed by the calculation unit 8 in the present embodiment, orientational change information of the camera is associated with input image coordinates in coordinate calculation, that is to say, an image height of an output image. However, originally, a movement of the camera is recorded in association with output coordinates in coordinate calculation, that is to say, an image height of an image in a memory. Therefore, to be exact, before use as a geometric deformation parameter, it is necessary to perform mapping in association with an output image, that is to say, an image height of input image coordinates in coordinate calculation. However, if a temporal change in a movement of the camera is small, orientational change information of the camera can be used as-is, because replacement of corresponding coordinates in the orientational change information of the camera between the image height of output image coordinates and the image height of input image coordinates creates small error.

Skew correction is processing for correcting a radial distortion and a distortion caused by aberration of the optics, such as transverse chromatic aberration, through geometric deformation, and mainly corrects a radial distortion. The calculation unit 8 obtains skew correction information as a geometric deformation parameter from a skew correction information retaining unit in the calculation unit 8, which retains the skew correction information in a form that enables search for a focal length, an in-focus distance, and an aperture value as indexes. The skew correction information may be, for example, a table showing a skew rate output from design data, or a ratio between an ideal image height and a skewed image height, which is a modified form of the skew rate.

The following describes the details of skew correction based on an exemplary case in which a table showing a ratio between image heights is used as the skew correction information. In coordinate calculation for realizing skew correction, which can be expressed by expression (10), coordinates before geometric transformation are transformed into polar coordinates in reference to the center of geometric deformation (reference coordinates for coordinate transformation) $X_{0d}$, $Y_{0d}$. High-accuracy correction can be realized by using the image center as the reference coordinates ($X_{0d}$, $Y_{0d}$).

$$r_n = \sqrt{(X_w - X_{0d})^2 + (Y_w - Y_{0d})^2} \quad (10)$$
$$r_d = f(r_n) r_n$$
$$\begin{bmatrix} X'_d \\ Y'_d \end{bmatrix} = \frac{r_d}{r_n} \begin{bmatrix} X_w - X_{0d} \\ Y_w - Y_{0d} \end{bmatrix} + \begin{bmatrix} X_{0d} \\ Y_{0d} \end{bmatrix}$$

Here, f(r) denotes an operation for obtaining a value of a ratio between an ideal image height and a skewed image height through interpolation based on the table showing the image height ratio using the ideal image height as an argument. The third expression denotes an operation of coordinate transformation from polar coordinates to Cartesian coordinates.

Figure 6A:
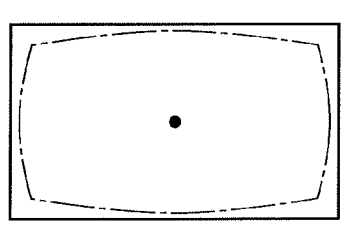
FIGS. 6A to 6C show examples of skew correction.
Figure 6B:
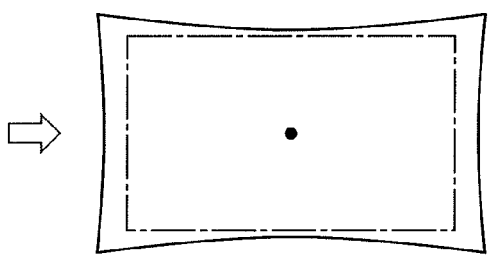
Figure 6C:
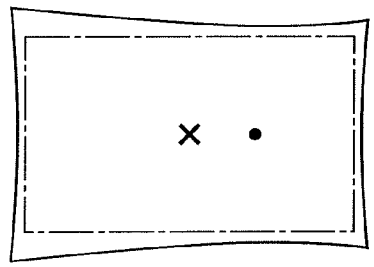

FIGS. 6A to 6C show examples of skew correction. FIG. 6A shows an original image, and an alternate long and short dash line therein indicates a state in which an image of a quadrilateral subject is captured in a skewed manner. FIG. 6B shows an image obtained as a result of skew correction, in which a subject region has been corrected to a correct shape. FIG. 6C shows an example in which geometric transformation has been performed after moving reference coordinates from central coordinates in the original image (x mark) to central coordinates of the image (back circle) that have been moved through the optical anti-shake operation, in consideration of the effects of the optical anti-shake operation.

A description is now given of processing of the reference coordinate determination unit 7 for determining reference coordinates in geometric deformation calculation. As described above, the deformation processing unit 9 according to the present embodiment collectively performs three corrections, i.e., skew correction, rolling shutter distortion correction, and shake correction through single coordinate calculation reflecting the substances of the corrections. As it is necessary to perform skew correction and shake correction using an image center as reference coordinates, reference coordinates must be determined appropriately in order to yield an intended correction result.

For example, if geometric deformation is performed using a position displaced from an image center as reference coordinates based on skew correction information that has been prepared on the precondition that the image center is used as the reference coordinates, a peripheral portion of an image with a large correction amount is distorted due to overcorrection. Regarding the shake correction also, if the reference coordinates is shifted from the image center, for example, a translation amount is produced that does not originally exist at the time of planar rotation correction and magnification/reduction correction. This is because a movement related to magnification/reduction, which does not originally exist, is mixed in by performing geometric transformation using a position displaced from the image center as reference coordinates after performing projection correction through projective transformation.

Figure 9A:
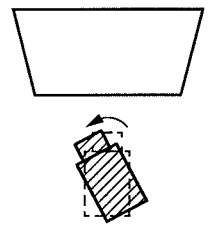
FIGS. 9A to 9C are diagrams for describing the effects of reference coordinates on the result of correction through geometric deformation processing.
Figure 9B:
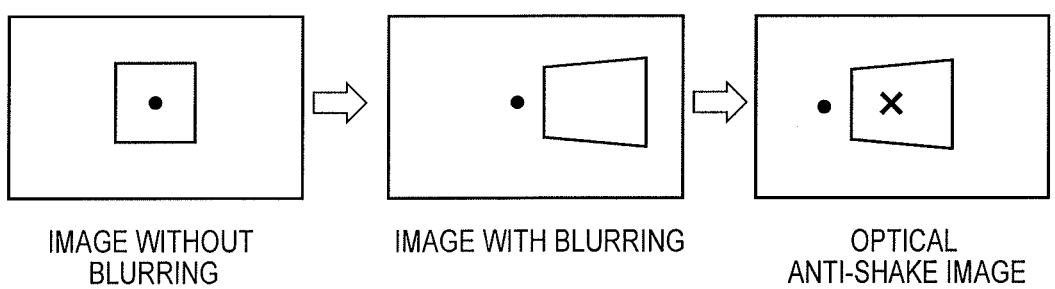
Figure 9C:
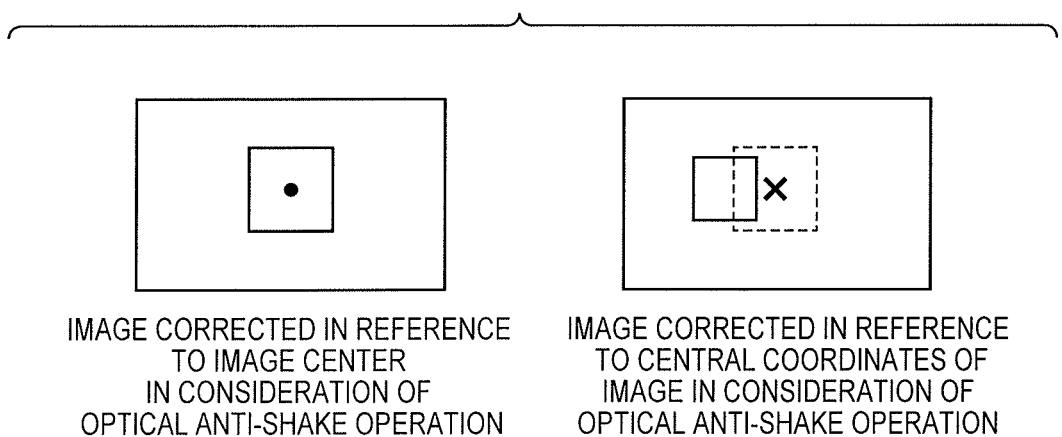

With reference to FIG. 9A to 9C, the following describes the effects of reference coordinates on the result of correction through geometric deformation processing. FIG. 9A shows a state in which the digital camera that captures a frontal image of a square subject has panned in the left yaw direction relative to the subject. An image before the pan (the leftmost part of FIG. 9B) changes into an image shown in the middle part of FIG. 9B as a result of the pan. That is to say, in the image, the subject moves to the right and becomes displaced from the correct position, and the shape of the subject visibly changes due to the projection. If the digital camera has an optical anti-shake function, the image translates as shown in the rightmost part of FIG. 9B due to translation of the anti-shake element, and the subject's position in the image is corrected to maintain the position before the pan operation (optical anti-shake image). FIG. 9C shows images that have been corrected in consideration of the effects of pan-caused projection and the like by applying geometric deformation processing to this optical anti-shake image.

The left part shows an image that has been corrected by cancelling a translation amount of an image attributed to an optical anti-shake operation from a correction amount using the image center (●) as reference coordinates, and the right part shows an image that has been corrected in a similar manner using the central coordinates (x) of the optical anti-shake image as reference coordinates. In FIG. 9C, as is apparent from a difference from the original image of the subject indicated by a dash line, unless the geometric deformation processing is performed using the image center as reference coordinates, the corrected image of the subject indicated by a solid line changes in size and position due to addition of a magnification/reduction operation and a translation operation, which do not originally exist.

Meanwhile, some geometric deformation processing achieves a corrected image with no problem even if the reference coordinates and the image center do not match. Specific examples of such geometric deformation processing are shake correction in the translational direction and rolling shutter distortion correction in the translational direction. For example, in geometric deformation processing for performing rolling shutter distortion correction, one of the following lines can be used as a line of reference coordinates for transformation: (1) the first line in the image, (2) the central line of the image, and (3) a line including the image center. FIGS. 7A to 7C schematically show the results of correction according to lines of reference coordinates.

If only the rolling shutter distortion correction is performed, a difference in the positions of a reference line does not become a significant problem. However, if collective correction is performed including other corrections, the rolling shutter distortion correction is often performed in the first half or in the middle of the entire calculation, thereby affecting other corrections that are performed thereafter. Therefore, if the rolling shutter distortion correction that moves the image center is performed, the result of collective correction undesirably reflects unintended translation and magnification/reduction.

If the skew, rolling shutter distortion, and shake included in an image are detected by inter-image matching and motion vector estimation, and a correction parameter is estimated through fitting to corresponding points or motion vectors, there is no need to pay attention to reference coordinates for geometric deformation. This is because a correction parameter is estimated in relation to a state in which the magnification/reduction and translation caused by displacement between the reference coordinates for geometric deformation and the image center are included as a movement of the image.

On the other hand, in the present embodiment, a correction amount is calculated based on orientational change information of the image capture apparatus, and therefore it is necessary to prevent the magnification/reduction and translation caused by displacement between the reference coordinates for geometric deformation and the image center. For this reason, an intended correction result is realized through collective correction by determining the reference coordinates for geometric deformation such that they match the image center through a sequence of correction processing. FIG. 8 schematically shows control in which an image center is used as reference coordinates for geometric deformation related to the rolling shutter distortion correction, skew correction, and shake correction. In order to enable determination of such reference coordinates, the present embodiment has the following configuration: the monitoring unit 5 is provided to obtain information of a translation amount of an image through an optical anti-shake operation, and the reference coordinate determination unit 7 recognizes a position of an image center after the optical anti-shake operation from the translation amount and determines the same as reference coordinates for geometric deformation.

Specifically, for any frame of a captured image, the reference coordinate determination unit 7 determines reference coordinates for geometric deformation based on a normalized translation amount $sh_x(j)$ (x: Y, P) of each time point owing to an optical anti-shake operation, or on an image coordinate amount obtained by multiplying the same by a focal length. This would be a reference line in the case of the rolling shutter distortion correction. For example, if the image center is the reference coordinates for geometric deformation when the optical anti-shake mechanism is not functioning, the reference coordinate determination unit 7 sets the translation amount $sh_x(j)$ (x: Y, P) as the reference coordinates in the above-described coordinate calculation expression. Alternatively, the reference coordinate determination unit 7 executes translation processing for image coordinates indicated by the following expression (11) before executing processing for skew correction, rolling shutter distortion correction, and shake correction, and moves the reference coordinates for geometric deformation along with a movement of the anti-shake element 11.

$$SHFT = \begin{bmatrix} 1 & 0 & -shy_Y(j) \\ 00 & 1 & -sh_P(j) \\ 0 & & 1 \end{bmatrix},$$ (11)

$$SHFT^{-1} = \begin{bmatrix} 1 & 0 & shy_Y(j) \\ 00 & 1 & sh_P(j) \\ 0 & & 1 \end{bmatrix}$$

In expression (11), $SHFT_{-1}$ denotes the inverse transformation applied after the geometric deformation. After a reference point of geometric deformation is moved to the image center through this processing, the deformation processing unit 9 applies the geometric deformation processing; thereafter, the reference point is restored to its original position. The reference coordinate determination unit 7 may output the base parameter $sh_x(j)$ (x: Y, P) to the geometric deformation unit 9 instead of outputting the moved reference coordinates.

A description is now given of a procedure for calculating an amount of geometric deformation by the calculation unit 8. The calculation unit 8 calculates a geometric transformation parameter for rolling shutter distortion correction and shake correction using the orientational change information output from the shake information obtaining unit 4, as well as a normalized translation amount $sh_x$ and a change velocity $\Delta sh_x$ of each time point output from the monitoring unit 5.

Below is a description of a method for calculating a geometric transformation parameter for shake correction. The calculation unit 8 integrates sampling data of the orientation sensor included in the shake information obtaining unit 4 in accordance with the following expression (12) so as to express an amount of change in one frame period.

$$rat_{x\_fr}(j) = \int_0^{n_{y\_g}-1} rat_{x\_g}(n_{fr\_g} j + i) dt$$ (12)

Here, dt=Δtg denotes a sampling period of the orientation sensor, and $n_{fr\_g}$ denotes a scale factor of a sampling period after performing the integration under the assumption that a sampling period of the orientation sensor is one. Also, $rat_{x\_fr}$ and $rat_{x\_g}$ denote angular velocities in one frame period and one sampling period of the orientation sensor.

Figure 10A:
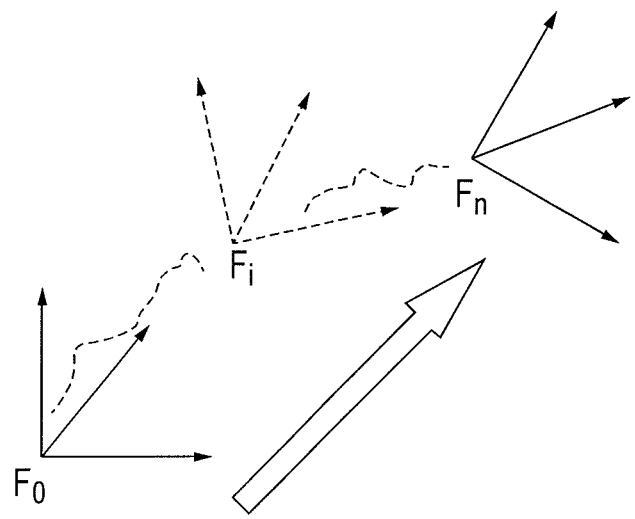
FIGS. 10A and 10B schematically show gradual integration of orientational changes on a per-frame period basis.
Figure 10B:
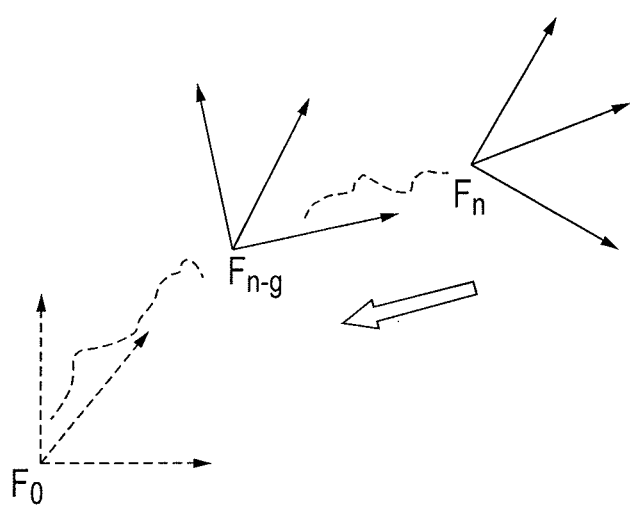

Then, the calculation unit 8 integrates the angular velocities obtained in one frame period with respect to each axis of the orientation sensor using, for example, an IIR-type LPF. As shown in FIG. 10B, the calculation unit 8 calculates a correction amount that causes frames to positionally match an orientation state $F_0$ of the digital camera at a certain time point in the past. FIGS. 10A and 10B schematically show examples of gradual integration of orientational changes on a per-frame period basis; specifically, FIG. 10A shows estimation of positions/orientations from an initial frame $F_0$, and FIG. 10B shows positional matching to a certain frame $F_{n-g}$ that is posterior to the initial frame (anti-shake operation).

$$[ang_x(j), \text{buf}] = iirLPF(rot_{x\_fr}(j), \text{buf})(x: Y, P, R) \qquad (13)$$

Expression (13) represents calculation of the IIR-type LPF used in the integration. A cutoff frequency is set to be lower than that for the case of the optical anti-shake operation. If the feedback gain of the IIR filter is increased, the past state is strongly maintained, and therefore the state of the initial frame $F_0$ is maintained as shown in FIG. 10A. By performing integration for a certain degree of reversion as shown in FIG. 10B, a margin for geometric deformation can be further attained. Therefore, the calculation unit 8 sets a relatively low feedback gain of the IIR filter used in the integration, performs integration of orientations/angular velocities so as to discard orientations in the past little by little, and calculates an orientational/angular change targeted for correction through geometric deformation.

The calculation unit 8 inserts the orientational/angular change obtained through such integration into the nomography matrix H of the shake correction angle indicated by expression (7), and calculates a correction amount that does not take the optical anti-shake operation into consideration. That is to say, the correction amount is as follows.

$$Y(j) = ang_Y(j),$$
$$P(j) = ang_P(j),$$
$$R(j) = ang_R(j)$$

$$H(j) = \begin{bmatrix} a & b & c \\ d & e & f \\ g & h & i \end{bmatrix}$$

$$= \begin{bmatrix} \cos(-\alpha R(j)) & -\sin(-\alpha R(j)) & 0 \\ \sin(-\alpha R(j)) & \cos(-\alpha R(j)) & 0 \\ 0 & 0 & 1 \end{bmatrix} \begin{bmatrix} \cos(-\alpha Y(j)) & 0 & \sin(-\alpha Y(j)) \\ 0 & 1 & 0 \\ -\sin(-\alpha Y(j)) & 0 & \cos(-\alpha Y(j)) \end{bmatrix} \begin{bmatrix} 1 & 0 & 0 \\ 0 & \cos(-\alpha P(j)) & -\sin(-\alpha P(j)) \\ 0 & \sin(-\alpha P(j)) & \cos(-\alpha P(j)) \end{bmatrix}$$

(14)

The calculation unit 8 further calculates a correction amount H'(i) that takes the optical anti-shake operation into consideration by subtracting an amount corrected by the optical anti-shake function from a shake correction amount H(j) calculated from the state of the orientational change.

$$H'(i) = \begin{bmatrix} a & b & c - sh_Y(j) \\ d & e & f - sh_P(j) \\ g & h & 1 \end{bmatrix} \qquad (15)$$

It should be noted that, before subtracting the amount corrected by the optical anti-shake function, the calculation unit 8 performs normalization by dividing the entire matrix by elements of three rows and three columns in H(i) for the purpose of matrix scaling. Here, $sh_x(i)$ (x: Y, P) is a normalized translation amount of an image through the optical anti-shake operation at a time point i, which is obtained from the monitoring unit 5.

By using the shake correction amount H'(i) that takes a correction amount of the optical anti-shake operation into consideration, correction can be performed through geometric deformation of a degree of freedom shown in FIG. 4 in a shake correction stage of collective correction by the geometric deformation unit 9. In particular, by obtaining a translation amount obtained from the monitoring unit 5 in relation to a correction amount for translation, a movement amount that has already been corrected through the optical anti-shake operation can be subtracted from geometric transformation. Alternatively, information may be output to the deformation processing unit 9 in the form of parameters Y(j), P(j), R(j), $sh_x(j)$ (x: Y, P), which are easily treated.

The calculation unit 8 also calculates a correction amount for the rolling shutter distortion correction using the orientational change information obtained by the shake information obtaining unit 4, as well as a normalized translation amount $sh_x$ and its change velocity $\Delta sh_x$ of each time point output from the monitoring unit 5.

The following expression (16) is a phenomenological expression showing the process of the occurrence of a rolling shutter distortion.

$$\vec{x}' = \vec{x} + \int_{t_1}^{t} m(\vec{x}; \vec{p}(s)) ds$$
$$t = y'\tau \approx y\tau, \tau t_1 = y_1 \tau \qquad (16)$$

Here, x' denotes image coordinates for the rolling shutter distortion, x→ denotes image coordinates after the rolling shutter correction, and m( ) denotes a spatial motion model function. The second term on the right-hand side denotes a movement in an image caused by a movement of the digital camera that occurs in a shift $(y-y_1)\tau$ between an exposure period of a reference line $y_1$ and an exposure period of a horizontal line y including a pixel targeted for geometric deformation. Also, $t_1$ denotes a time point of image capture (exposure) for a reference line, t denotes a time point of image capture (exposure) for a horizontal line including a pixel targeted for correction, and p→(t) denotes a vector amount indicating a motion information parameter.

Furthermore, if the orientational change information obtained from the shake information obtaining unit 4 indicates an orientational change of the digital camera 100 in the yaw, pitch, and roll directions, expression (16) can be simplified, that is to say, the function m( ) can be factored out of the integration, as indicated by the following expression (16')

$$\vec{x} = \vec{x}' - m(\vec{x}; \int_{t_1}^{t'} \vec{p}(s) ds) \quad (16')$$

Furthermore, m(θ) can be expressed as f tan θ in the case of, for example, the yaw, pitch, and roll directions. Therefore, a correction expression corresponding to a pixel included in any horizontal line can be expressed as follows.

$$\vec{x} = \vec{x}'(, l) - (f \tan(\int_{t_1}^{t'_1} \theta_Y(s) ds), -f \tan(\int_{t_1}^{t'_1} \theta_P(s) ds))^T \quad (17)$$

Here, x'→(, l) indicates a correction expression for any pixel in a horizontal line of an image height l of a rolling shutter distortion image. That is to say, it indicates that the same correction amount is applied to pixels included in the same horizontal line. Furthermore, the following correction expression can be derived also for the roll direction.

$$\vec{x} = R(\vec{x}'(, l), -\int_{t_1}^{t'_1} \theta_R(s) ds) \quad (18)$$

Here, R(x'→(, l), θ) indicates that the horizontal line of the image height l is rotated by θ on a per-line basis. Based on the above interpretation and approximation of the phenomenological expression, a correction amount for the rolling shutter distortion can be obtained for any horizontal line in frames through integration in reference to a line $y_1$ of an image height including reference coordinates determined by the reference coordinate determination unit 7.

In order to subtract the effects of the optical anti-shake operation, the calculation unit 8 also subtracts a change velocity $\Delta sh_x(l)$ of translation through the optical anti-shake operation for any horizontal line in frames, which has been calculated by the monitoring unit 5, from the expressions of the yaw, pitch, and roll directions. As a result, a correction amount shown by the following expression is obtained.

$$\vec{x} = \vec{x}'(, l) - ((\int_{t_1}^{t'_1} f \tan \theta_Y(s) - \Delta sh_Y(s) ds), -(\int_{t_1}^{t'_1} f \tan \theta_P(s) - \Delta sh_P(s) ds))^T \quad (19)$$

Using the above expression, the calculation unit 8 considers a horizontal line of an image height including reference coordinates as a reference line, and calculates, for any horizontal line in an image and for any of the roll, pitch, and yaw axes, a correction amount by integration of orientational changes from the reference line and changes in a translation amount through the optical anti-shake operation. The calculation unit 8 outputs the calculated correction amount to the deformation processing unit 9.

$$\Delta X(l) = \int_{t_1}^{t'_1} f \tan \theta_Y(s) - \Delta sh_Y(s) ds$$

$$\Delta P(l) = \int_{t_1}^{t'_1} f \tan \theta_P(s) - \Delta sh_P(s) ds$$

$$\Delta \Theta(l) = \int_{t_1}^{t'_1} \theta_R(s) ds \quad (20)$$

It should be noted that, if the backward mapping is performed, it is necessary to reconstruct parameters by mapping data arrangement of ΔX, ΔP, ΔΘ based on parameters of ΔP(l). Furthermore, regarding the skew correction, skew correction information is obtained from the retaining unit of the calculation unit 8 using camera parameters such as a focal length, an aperture, and a subject distance of each time point as indexes. The skew correction information is a coefficient of a higher-order correction function that is calculated in advance from design values of the optics and stored in the calculation unit 8.

The deformation processing unit 9 applies geometric deformation processing to frames after the optical anti-shake correction using the following items, and generates images from the obtained frames after the anti-shake correction.

Reference coordinates for geometric deformation ($sh_Y(j)$, $sh_P(j)$) obtained by the reference coordinate determination unit 7

The following amounts of geometric deformation (correction amounts) calculated by the calculation unit 8
 skew correction parameter f(r)
 shake correction parameters Y(j), P(j), R(j), $sh_Y(j)$, $sh_P(j)$
 Rolling shutter correction parameters ΔX, ΔP, ΔΘ

As described above, in the present embodiment, an image capture apparatus that obtains a corrected image by combining an optical anti-shake function and a plurality of geometric deformation processing uses, as reference coordinates for the plurality of geometric deformation processing, coordinates corresponding to an intersection of the optical axis and the image sensor after movement through the anti-shake operation of the optical anti-shake mechanism. This makes it possible to execute the geometric deformation processing based on the orientational change information of the image capture apparatus, thereby enabling appropriate correction also for an image that was captured in a low-luminance environment with lower accuracy and a low-contrast image of a subject using a method for detecting a movement from an image. Furthermore, as the orientational change information used in the optical anti-shake function can be shared to the geometric deformation processing, complicated calculation that could possibly be essential in estimating a movement from an image is no longer necessary; this is effective in reduction of calculation load and power consumption.

Second Embodiment

Figure 11:
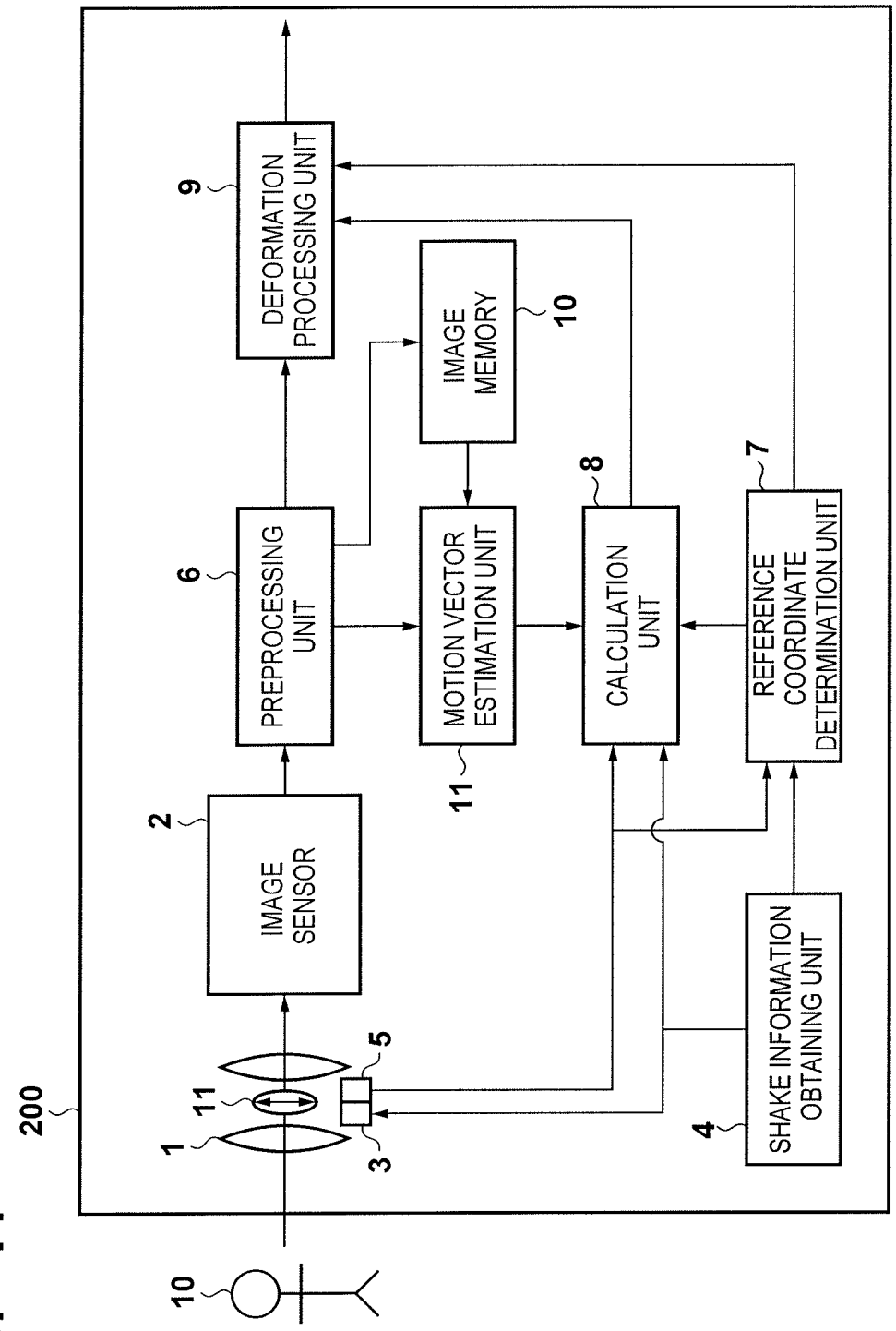
FIG. 11 shows an example of a functional configuration of a digital camera according to a second embodiment related to anti-shake control.

FIG. 11 shows an example of a functional configuration of a digital camera 200, which is one example of an image capture apparatus according to a second embodiment of the present invention, related to anti-shake control. In FIG. 11, constituents that are similar to those of the digital camera 100 according to the first embodiment are given the same reference numerals thereas, and a description thereof is omitted.

An image memory 10 temporarily stores a captured image generated by the preprocessing unit 6.

A motion vector estimation unit 11 detects motion vectors or corresponding points between a captured image temporarily stored in the image memory 10 and a captured image directly input from the preprocessing unit 6.

The calculation unit 8 according to the present embodiment not only has a function of calculating an amount of geometric deformation using only information from the shake information obtaining unit 4 and the monitoring unit 5 as described in the first embodiment, but also can calculate an amount of geometric deformation from information of motion vectors or corresponding points.

The calculation unit 8 according to the present embodiment normally calculates an amount of geometric deformation based on information of motion vectors or corresponding points. It switches to calculation of an amount of geometric deformation using information from the shake information obtaining unit 4 and the monitoring unit 5 as described in the first embodiment (without using information of motion vectors and corresponding points) if motion vectors and corresponding points decrease in reliability or fail to be detected in, for example, a dark room or a crowd of people in a downtown area.

It should be noted that motion vectors fail to be detected if the number of effective vectors output from the motion vector estimation unit 11 falls below the minimum number of vectors that has been set in advance. The effectiveness and reliability of vectors are calculated or determined based on, for example, a characteristic amount of a position of calculation at the time of vector calculation, dispersion on templates in the case of template matching, and uniqueness of the peak of correlation scores. Alternatively, fitting is applied to a plurality of obtained vectors using RANSAC (random sample consensus) and the like so as to analyze correlation between vectors. The reliability of motion vectors can be obtained by assigning the resultant degree of conformance and error in a norm as scores.

A detailed description of a method for calculating an amount of geometric deformation from information of motion vectors and corresponding points is omitted as any conventional technique can be used as such a method. The present embodiment can achieve the effects similar to those achieved by the first embodiment.

Other Embodiments

The above-described embodiments are applied to an image capture apparatus of the present invention. The present invention is also applicable to various types of apparatuses that have a built-in image capture apparatus, and to various types of apparatuses that are connectable to an image capture apparatus. For example, the present invention can be embodied on a variety of apparatuses that can use a camera, such as a mobile telephone, a game terminal, a personal computer, a tablet terminal, a video event data recorder, a navigation system, and a robot.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-147920, filed on Jul. 16, 2013, which is hereby incorporated by reference herein its entirety.

What is claimed is:

1. An image capture apparatus performs an optical anti-shake function that reduces an image shake by driving an anti-shake element in a different direction from an optical axis of an imaging optical system in accordance with a detected shake, the image capture apparatus comprising:
    a determination unit configured to determine, when a plurality of geometric deformation correction processes are electronically applied to a captured image captured by an image sensor, respective reference coordinates for the plurality of geometric deformation correction processes to be a coordinate of an intersection of the optical axis moved by the optical anti-shake function and the image sensor; and
    a deformation processing unit configured to electronically apply the plurality of geometric deformation correction processes to the captured image using the respective reference coordinates determined by the determination unit and an amount of geometric deformation based on the detected shake.

2. The image capture apparatus according to claim 1, wherein
    the determination unit obtains the coordinate of the intersection of the optical axis and the image sensor by measuring an amount and direction of a movement of the anti-shake element.

3. The image capture apparatus according to claim 1, wherein
    the determination unit obtains the coordinate of the intersection of the optical axis and the image sensor by converting control information of the anti-shake element to an amount and direction of a movement of the anti-shake element.

4. The image capture apparatus according to claim 1, wherein
    the plurality of geometric deformation correction processes include at least two of rolling shutter distortion correction process, planar rotation correction, tilt correction, and skew correction.

5. The image capture apparatus according to claim 1, wherein
    the deformation processing unit applies the respective geometric deformation correction processes of a correction amount corresponding to a difference between an amount of the detected shake and an amount of a shake reduced by the optical anti-shake function.

6. The image capture apparatus according to claim 1, further comprising
    an estimation unit configured to detect a motion vector or corresponding point between images captured at different time points, wherein
    the deformation processing unit applies the respective geometric deformation correction processes using an amount of geometric deformation based on information of the motion vector or the corresponding point detected by the estimation unit if reliability of the detected motion vector or corresponding point is not determined to be low, and applies the respective geometric deformation correction processes using the reference coordinates and the amount of geometric deformation based on the detected shake if the reliability of the detected motion vector or corresponding point is determined to be low.

7. A control method for an image capture apparatus an optical anti-shake function that reduces an image shake by driving an anti-shake element in a different direction from an optical axis of an imaging optical system in accordance with a detected shake, the control method comprising:
    determining, when a plurality of geometric deformation correction processes are electronically applied to a captured image captured by an image sensor, respective reference coordinates for the plurality of geometric deformation correction processes to be a coordinate of an intersection of the optical axis moved by the optical anti-shake function and the image sensor; and electronically applying the plurality of geometric deformation correction processes to the captured image using the respective reference coordinates determined and an amount of geometric deformation based on the detected shake.

* * * * *